US008503462B2

(12) United States Patent
Damola et al.

(10) Patent No.: US 8,503,462 B2
(45) Date of Patent: Aug. 6, 2013

(54) METHOD AND APPARATUS FOR REMOTE ACCESS TO A LOCAL NETWORK

(75) Inventors: Ayodele Damola, Kista (SE); Martin Gerdes, Monschau-Rohren (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 423 days.

(21) Appl. No.: 12/867,993

(22) PCT Filed: Jun. 18, 2008

(86) PCT No.: PCT/SE2008/050731
§ 371 (c)(1),
(2), (4) Date: Aug. 17, 2010

(87) PCT Pub. No.: WO2009/113931
PCT Pub. Date: Sep. 17, 2009

(65) Prior Publication Data
US 2011/0002341 A1    Jan. 6, 2011

(30) Foreign Application Priority Data
Mar. 14, 2008    (SE) ........................................ 0800608

(51) Int. Cl.
*H04L 12/28*    (2006.01)
(52) U.S. Cl.
USPC .......................................... 370/401; 370/254
(58) Field of Classification Search
USPC ............................................. 370/254, 401
See application file for complete search history.

(56) References Cited

U.S. PATENT DOCUMENTS 8,165,579 B2 * 4/2012 Tanabe et al. ............... 455/432.1

2004/0068574 A1 * 4/2004 Costa Requena et al. .... 709/230
2004/0221037 A1 * 11/2004 Costa-Requena et al. .... 709/225
2006/0133392 A1 * 6/2006 Ajitomi et al. ................ 370/401
2006/0155814 A1 * 7/2006 Bennett et al. ............... 709/207
2007/0234041 A1 * 10/2007 Lakshmeshwar et al. .... 713/156
2008/0311890 A1 * 12/2008 Benco et al. ............... 455/414.1

FOREIGN PATENT DOCUMENTS

| WO | WO 2007/073403 A1 | 6/2007 |
| WO | WO 2007/104358 A1 | 9/2007 |
| WO | WO 2007/122577 A1 | 11/2007 |
| WO | WO 2007/131548 A1 | 11/2007 |
| WO | WO 2007/142480 A1 | 12/2007 |

OTHER PUBLICATIONS

Home Gateway Initiative, HGI guideline paper: Remote Access, Version 1.01, May 18, 2008, retrieved from http://www.homegatewayinitiative.org/publis/HGI_remote_access_v1.01.pdf.

(Continued)

*Primary Examiner* — Jason Mattis
(74) *Attorney, Agent, or Firm* — Myers Bigel Sibley & Sajovec, P.A.

(57) ABSTRACT

A method and apparatus for enabling remote access to a local gateway (302) of a local network from a remote device (300) located outside the local network. Capabilities and credentials of the remote device and of the local gateway are configured independently in an IMS core (304) for the remote access. One or more users are also authorized for remote access to the local network by adding an IMS identity of each authorized user to an IMS based ACL (Access Control List). An access request to the local gateway from the remote device will be accepted if the IMS identity of the remote device user is present in the IMS based ACL. A remote access connection can then be established by means of the configured capabilities and credentials of the remote device and the local gateway.

20 Claims, 5 Drawing Sheets

OTHER PUBLICATIONS

International Search Report, PCT Application No. PCT/SE2008/050731, Mar. 4, 2009.
Written Opinion of the International Searching Authority, PCT Application No. PCT/SE2008/050731, Mar. 4, 2009.
English language translation of First Office Action, Chinese Patent Application No. 200880128031.8, Aug. 31, 2012.

* cited by examiner

METHOD AND APPARATUS FOR REMOTE ACCESS TO A LOCAL NETWORK

CROSS REFERENCE TO RELATED APPLICATIONS

This application is a 35 U.S.C. § 371 national stage application of PCT International Application No. PCT/SE2008/050731, filed on 18 Jun. 2008, which claims priority to Swedish Application 0800608-2, filed 14 Mar. 2008, the disclosure and content of both of which are incorporated by reference herein in their entirety. The above- referenced PCT International Application was published in the English language as International Publication No. WO 2009/113931 A1 on 17 Sep. 2009.

TECHNICAL FIELD

The present invention relates generally to a method and apparatus for enabling remote access to services and communication devices in a local network, from a communication device located outside the local network.

BACKGROUND

A multitude of different types of communication terminals, often referred to simply as "devices", have been developed for packet-based multimedia communication using IP (Internet Protocol). Multimedia services typically entail transmission of media in different formats and combinations over IP networks. For example, an IP-enabled terminal may exchange media such as visual and/or audio information with another IP-enabled terminal, or may download media from a content server over the Internet.

A network architecture called IMS (IP Multimedia Subsystem) has been developed as a platform for handling and controlling IP-based multimedia services and sessions, commonly referred to as the IMS network or IMS core. Thus, an IMS network can be used to set up and control multimedia sessions for communication terminals connected to various access networks, regardless of the access technology used.

Multimedia sessions are handled by specific session control nodes in the IMS network, e.g. the nodes P-CSCF (Proxy Call Session Control Function), S-CSCF (Serving CSCF), and I-CSCF (Interrogating CSCF). Further, a database node HSS (Home Subscriber Server) in the IMS network stores subscriber and authentication data. The IMS network may further include various application servers and may also be connected to external services providers.

According to the IMS platform, the protocol called "SIP" (Session Initiation Protocol) is generally used to initiate, manage and terminate multimedia sessions. Standard SIP messages can thus be used by IP terminals or devices for establishing sessions, such as the common session initiating message "SIP invite" and the common response message "SIP 200 OK". The "Session Description Protocol" can also be embedded as a self-contained body within SIP messages, to specify different communication parameters needed for a forthcoming multimedia session. This protocol is generally used to exchange necessary information in session setup procedures, e.g. device capabilities, media properties, currently used IP addresses, etc., as is well-known in the art.

IMS-based services can also be provided for devices in a local or private network such as a residential or office network, sometimes referred to as a LAN (Local Area Network). In this description, the generic term "local network" is used to represent any such networks, and the term "device" is used to represent any terminal capable of IP communication within a local network. In such local networks, a local IP address is allocated to each device for communication within the network, although it cannot be used for routing messages and data in the public domain outside that network.

A local network may include, e.g., fixed and wireless telephones, computers, media players, servers and TV sets. In order to provide IMS services to such devices, a multimedia gateway called "Home IMS Gateway, HIGA" has been defined that can emulate an IMS terminal from the local network towards the IMS network, to access IMS services on behalf of any device in the local network.

UPnP (Universal Plug-and-Play) is an architecture with standardised device protocols for communication within a local network between different devices that may use different access methods, operating systems, programming languages, format standards and communication protocols. Among other things, UPnP supports a process called "discovery" or "pairing", in which a device can join a local network, obtain a local IP address, announce its name and IP address, and exchange capabilities and services with other devices in the network. In this description, any device capabilities for data transport, communication, encoding, storing and display will be referred to as "capabilities" for short.

UPnP also defines a Remote Access Architecture RAA, enabling remote "UPnP devices" located outside the local network to communicate with devices located within the network. In particular, the RAA specifies how to provision and configure parameters required for enabling remote access connections between entities having a Remote Access Server RAS and a Remote Access Client RAC, respectively. In this field, control points for the RAS and RAC functionality is sometimes generally referred to as the "UPnP RA management console". However, the UPnP RAA does not provide any solution for making such remote access connections secure, nor how to deliver any credentials or qualifications needed for safe connections. For example, no solution has been presented so far for authenticating or verifying a remote device when accessing the local network from the outside.

In FIG. 1, a local network 100 is shown with different local devices, in this example including a wireless telephone, a fixed telephone, a TV set, a laptop computer, and a media server. The network 100 also includes a conventional gateway 102 referred to as a "residential gateway RGW", which is connected to an external access network 104 to provide a communication link to other networks and entities. The RGW 102 typically includes a NAT (Network Address Translation) function and a local DHCP (Dynamic Host Configuration Protocol) server, not shown, configured to allocate local IP addresses to the devices, as is well-known in the art.

The local network 100 further includes a HIGA 106 providing a connection to an IMS network 108 in which an HSS 110 is shown. The HIGA 106 has suitable interfaces towards the different devices in network 100 using device-adapted protocols, as indicated by dashed lines. In practice, a HIGA may be integrated in an RGW, but logically it will be considered as an individual functional unit in this description.

The HIGA 106 holds IMS identity information 112 associated with IMS subscriptions and user/service profiles, which can be used for accessing the IMS network 108 where corresponding subscriber information 114 is stored in the HSS node 110. Accordingly, a user can log on to the IMS network from a device in the local network 100 by means of HIGA 106, and the local IP address of the used device can then be associated with a profile of the user. In WO 2006/045706 (Ericsson) it is described how devices in a local network can obtain IMS services by means of a HIGA.

When HIGA 106 receives a request for a multimedia service from a device in network 100 using a device-specific interface/protocol, HIGA 106 translates the service request into a valid IMS request (e.g. SIP invite) on behalf of the device, to set up a session for the device by communicating suitable SIP messages with the IMS network 108. In a similar manner, an IMS session can be set up by HIGA 106 for an incoming request for communication with a device in network 100, by using an IMS identity 112 associated with the device. In either case, any communicated media is routed during the session from or to the device over the RGW 102 and the access network 104, as indicated by two-way arrows.

FIG. 1 further illustrates that a local device 100a in network 100 moves outside to become a remote device 100a'. The remote device 100a' can then send a SIP invite message to the HIGA 106 over the IMS network 108, to initiate media communication with one of the remaining devices in network 100. The remote device 100a' must then have a valid IMS identity for accessing the IMS network from outside the network 100.

In order to access a local device in network 100 remotely, the remote device 100a' must have gained knowledge of the local device somehow in a discovery process. The remote device may have taken part in a regular discovery process recently while being located inside the local network 100, typically involving the exchange of certain discovery messages according to a protocol called SSDP (Simple Session Discovery Protocol). If this is not the case, however, such as when the remote device has in fact never been inside the local network at all, it is necessary to exchange the discovery messages remotely.

FIG. 2 illustrates a possible logic structure in a remote device 200 and a local gateway 202 of a local network, respectively, for enabling remote access to local devices in the network (not shown). The local gateway 202 may be an RGW and/or a HIGA. A Remote Access Client RAC 200a has been configured in the remote device 200 and a corresponding Remote Access Server RAS 202a has been configured in the local gateway 202, which can be done when both are present in the local network since RAC 200a and RAS 202a should be configured with matching profiles.

The RAC 200a comprises a Remote Access Discovery Agent RADA 200b, and the RAS 202a comprises a corresponding Remote Access Discovery Agent RADA 202b, configured to exchange discovery messages between the two entities 200 and 202. The RAC 200a further comprises a Remote Access Transport Agent RATA 200c and the RAS 202a comprises a corresponding Remote Access Transport Agent RATA 202c, configured to establish a transport channel for media between the two entities 200 and 202. Effectively, the RATAs 200c, 202c will act as opposite end points for the remote access.

However, the UPnP RAA dictates that the entities in which a RAC and a RAS are implemented, must be physically present in the same local network in order to execute the necessary discovery or pairing process, which may naturally be a drawback. For example, a UPnP remote access enabled PC device located somewhere on the Internet, cannot get remote access to a device in a local network located somewhere else on the Internet, unless the PC device is first physically brought into the local network to perform the required discovery or pairing process. From a practical and usability viewpoint, this requirement may well be a problem. Moreover, it is also a problem that no trust model can be provided for such remote access, e.g. to verify or validate the remote device towards the local network, or vice versa.

SUMMARY

It is an object of the present invention to address the problems outlined above. Further, it is an object to provide a solution for enabling secure remote access connections to a local network without requiring physical presence in the local network. These objects and others may be obtained by providing a method and apparatus according to the independent claims attached below.

According to one aspect, a method is provided for enabling remote access to a local gateway of a local network from a remote device located outside the local network. First, capabilities and credentials of the remote device and of the local gateway are configured in an IMS core for the remote access. Then, one or more users are authorised for remote access to the local network by adding an IMS identity of each authorised user to an IMS based Access Control List ACL. When an access request to the local gateway is received from the remote device over the IMS core, the access request is accepted if the remote device user has been authorised for remote access by means of his/her IMS identity in the IMS based ACL. In that case, a remote access connection is established using the above configured capabilities and credentials of the remote device and the local gateway.

According to another aspect, a remote access server is provided in an IMS core for enabling remote access to a local gateway of a local network from a remote device located outside the local network. The remote access server comprises means for configuring capabilities and credentials of the remote device and the local gateway in the IMS core for the remote access, and means for authorising one or more users for remote access to the local network by adding an IMS identity of each authorised user to an IMS based ACL. The remote access server further comprises means for receiving an access request to the local gateway from the remote device over the IMS core, means for accepting the access request if a user of the remote device has been authorised for remote access by means of his/her IMS identity in the IMS based ACL, and means for establishing a remote access connection, if accepted, using the configured capabilities and credentials of the remote device and the local gateway.

According to yet another aspect, an arrangement in a local gateway of a local network is provided for enabling remote access to the local gateway from a remote device located outside the local network. The arrangement comprises means for configuring capabilities and credentials of the local gateway in an IMS core for the remote access, means for receiving an access request from the remote device over the IMS core, means for accepting the access request if a user of the remote device has been authorised for remote access by means of his/her IMS identity, and means for establishing a remote access connection if accepted, by means of capabilities and credentials configured for the remote device and the local gateway.

Different embodiments are possible in the method, remote access server and local gateway arrangement above. For example, the capabilities and credentials of the remote device may be configured in the IMS core by IMS messaging between an IMS client in the remote device and a remote access server in the IMS core. The capabilities and credentials of the local gateway may be configured in the IMS core by IMS messaging between an IMS client in the remote device and the remote access server. The credentials above may include a certificate for VPN tunnel establishment. Further, the capabilities above may include RATA capabilities of a RAS in the local gateway and RATA capabilities of a RAC in the remote device.

The capabilities and credentials above may be configured when the remote device is located outside the local network. An authorised user can access the local network remotely from any terminal by means of his/her IMS identity. The IMS based ACL may be maintained at the local gateway or in a remote access server at the IMS core.

If the remote device user has not been authorised for remote access by means of his/her IMS identity, it may be determined whether the access request is acceptable to a local network owner controlling the local network, e.g. by placing a query to the local network owner as to whether the access request can be accepted or not.

A UPnP based ACL containing UUIDs of devices allowed for remote access, may also be maintained in the local gateway. In that case, the UUID of the remote device may be added to the UPnP based ACL if the access request is accepted.

Further possible features and benefits of the present invention will be explained in the detailed description below.

BRIEF DESCRIPTION OF THE DRAWINGS

The invention will now be explained in more detail by means of preferred embodiments and with reference to the accompanying drawings, in which.

DETAILED DESCRIPTION

The present invention can be used to obtain safe remote access to services and/or devices in a local network from a remote device, without requiring that the remote device is physically present in the local network during the discovery or pairing process mentioned above. In this solution, remote access can be established over an IMS core by introducing a functionality in the IMS core for supporting authentication/authorisation and credential delivery for the remote access. In the following description, this functionality is schematically represented by an RA (Remote Access) Server in the IMS core. Further, a functionality for supporting IMS-based remote access is also introduced in the RAC and in the RAS, respectively, in the following description referred to as a "Remote Access Support Module" RASUM.

The terms RA server and RASUM are used throughout this description to generally represent functional units having features to be described below, although the present invention is not limited to any specific implementation of units. Furthermore, the term "local network owner" is used to generally represent a manager, administrator or other person that controls the local network, at least in the sense of handling the remote access service and deciding which users and devices are allowed to remotely access the network in the manner described herein.

Figure 3:
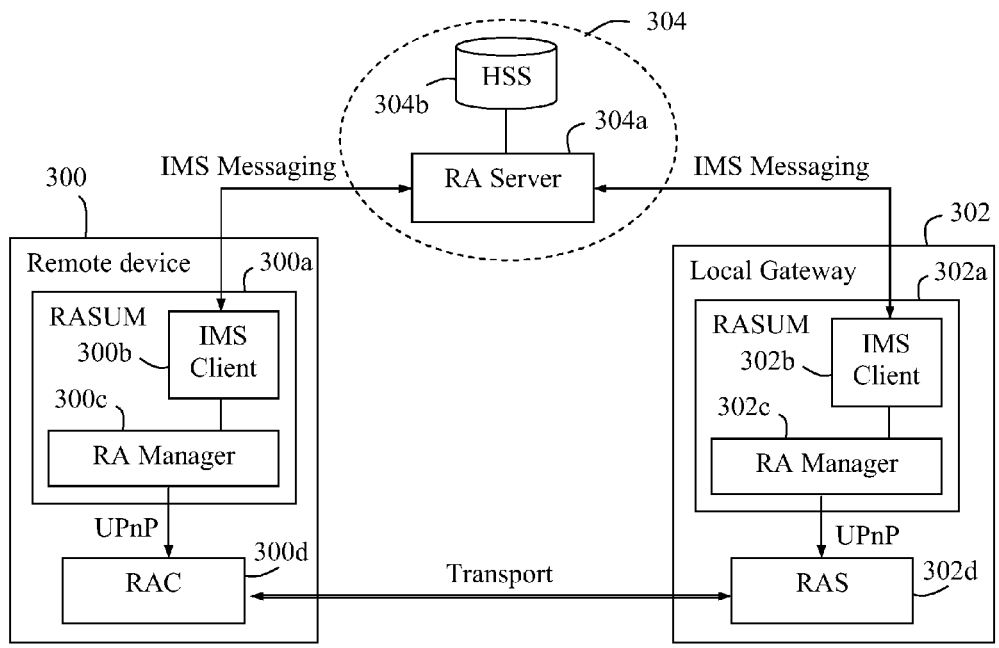
FIG. 3 is a block diagram illustrating a remote device accessing a local gateway of a local network over an IMS core, in accordance with one embodiment.

An exemplary embodiment of the inventive arrangement above is basically illustrated in FIG. 3. In this example, a remote device 300 can access a local gateway 302 of a local network over an IMS core 304, in order to establish a communication with a local device in the network, not shown. The remote device 300 may be a mobile terminal and the local gateway 302 may be a HIGA, although the present invention is not limited thereto. Remote device 300 and local gateway 302 comprise RASUM units 300a and 302a, respectively, and an RA server 304a resides in the IMS core 304 connected to an HSS node 304b therein.

Each RASUM unit 300a, 302a comprises an IMS client 300b, 302b adapted to exchange IMS messages with the RA server 304a, e.g. using SIP, particularly for configuring an IMS supported remote access service in the IMS core 304 and for establishing a remote access communication. The RASUM unit 300a in the remote device 300 further comprises an RA (Remote Access) manager console 300c adapted to interact with a RAC 300d by means of UPnP actions basically as defined by the UPnP RA architecture. Likewise, RASUM unit 302a in the local gateway 302 also comprises an RA manager console 302c adapted to interact with a RAS 302d by means of UPnP actions.

Briefly described, IMS-based remote access to a local network can be safely obtained for a remote device without requiring physically presence in the local network, in the following manner. Firstly, capabilities and credentials for the remote access are configured in the IMS core, by IMS messaging between IMS client 302b and RA server 304a, and by IMS messaging between IMS client 300b and RA server 304a, respectively. In this description, the term "credentials" refers to any parameters needed for establishing a safe connection, such as a certificate for VPN (Virtual Private Network) tunnel establishment as described in more detail below. Secondly, the remote device 300 is authorised for remote access to the local network using a trust model based on IMS security, by IMS messaging between IMS client 302a and RA server 304b. Thirdly, a remote access session is established by IMS messaging between IMS clients 300a and 302a over RA server 304b, and data is transported between a RATA in the RAC 300d and a RATA in the RAS 302d, as indicated by the bottom two-way arrow.

Figure 4:
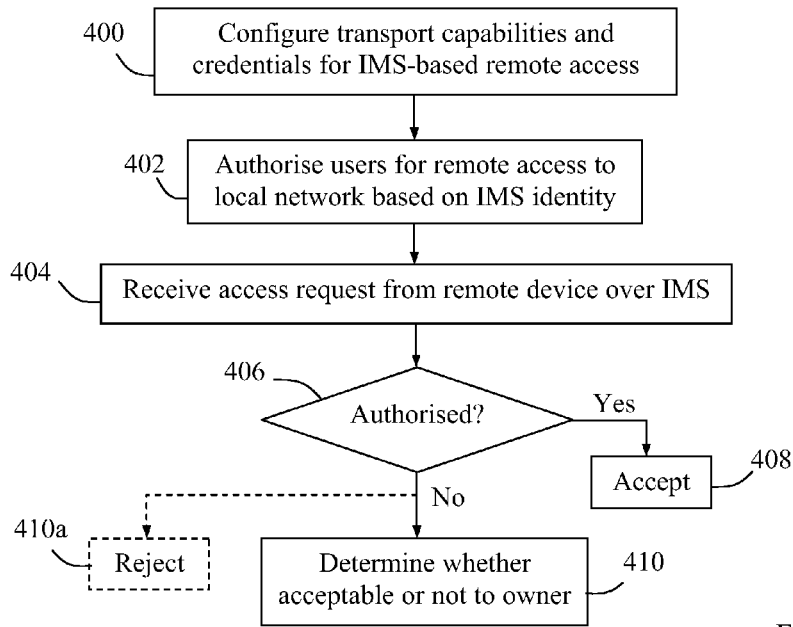
FIG. 4 is a flow chart illustrating a procedure for enabling safe remote access to a local network, in accordance with another embodiment.

A procedure for enabling safe remote access to a local network from a remote device, will now be described with reference to a flow chart in FIG. 4 and with further occasional reference to FIG. 3. This procedure thus provides a remote access service involving a local gateway 302 in the network, e.g. a HIGA, an RA server 304a in an IMS core 304 and a remote device 300. The local network is generally managed and controlled by a local network owner, at least in the manner specifically described below.

In a first step 400, capabilities and credentials of both remote access end points 302, 300 are configured in the IMS core 304 for the remote access service. In this step, IMS client 302a in the local gateway 302 exchanges suitable IMS messages with RA server 304b, in order to determine the RATA capabilities of RAS 302d in the IMS core. The credentials for the local gateway 302 are generated by the RA server 304b in IMS core 304, which are also delivered to the RA end point of gateway 302, i.e. the RATA in RAS 302d, which will be described in more detail below.

Likewise, IMS client 300a in the remote device 300 exchanges suitable IMS messages with RA server 304b, in order to configure capabilities of the remote device 300 in the IMS core, i.e. corresponding RATA capabilities of RAC 300d, and credentials for the device 300 which are delivered to the opposite RA end point, i.e. the RATA in RAC 300d. The remote access configuration for remote device 300 above can be performed when located outside the local network, hence not requiring physically presence in the local network.

For example, the credentials of gateway 302 and device 300, respectively, may be certificates corresponding to a supported tunnel establishment method such as a VPN tunnel based on IPSec (Internet Protocol Security). In that case, the certificates could be so-called "x.509 certificates" which are well-known in the art. However, the present invention is not limited to any particular credentials or certificates.

Configuring the RATA capabilities of RAS 302d and RAC 300d, respectively, in the IMS core 304 according to step 400 corresponds effectively to the above-described discovery process, although not requiring physical presence of the remote device 300 in the local network. Hence, step 400 can be considered to basically represent a configuring operation, i.e. configuring remote device 300 and local gateway 302 for remote access in the IMS core 304 which is done independent of each other. An example of how step 400 can be implemented in practice will be described later below with reference to FIG. 5.

Figure 1:
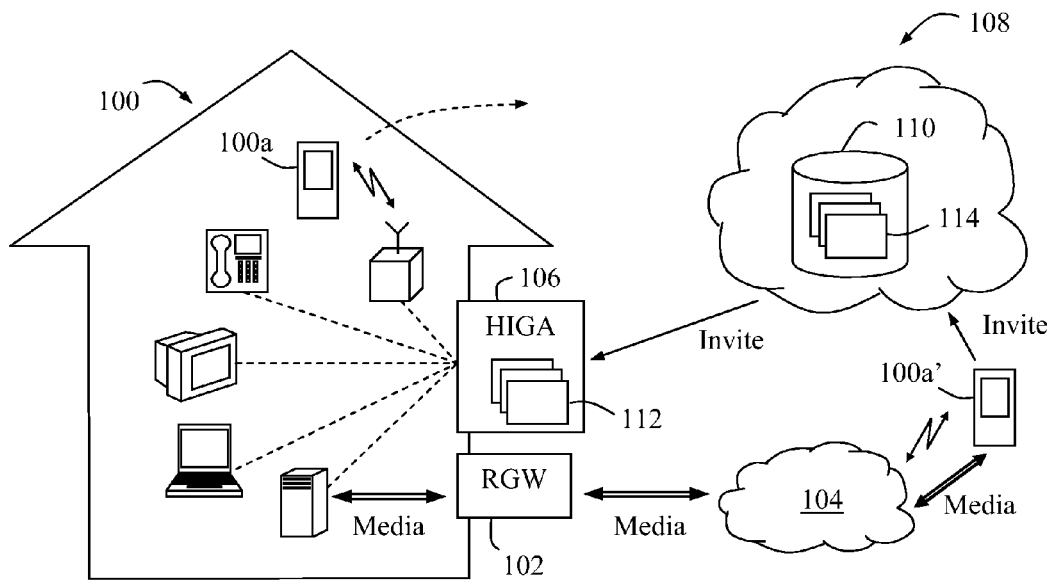
FIG. 1 is a schematic view illustrating a local network when a remote device accesses the network from a location outside the network, according to the prior art.
Figure 2:
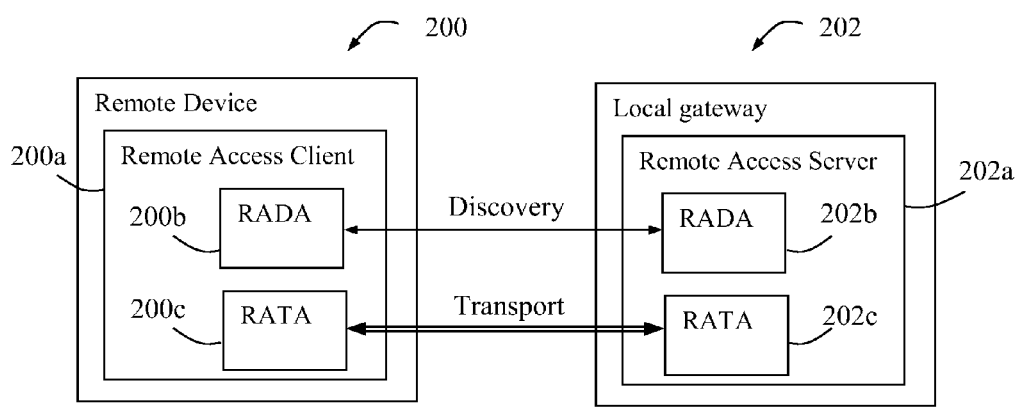
FIG. 2 is a block diagram illustrating remote access features in a remote device and in a residential gateway, according to the prior art.

In a next step 402, one or more specific users are authorised for remote access to the local network, including the user of remote device 300, as specified by the local network owner. The authorisation of remote access for a certain user is based on an IMS identity of that user which will provide a trustworthy validation as being required for accessing services in the IMS core. The IMS identity is typically a SIP URI (Universal Resource Identifier), e.g. alice@op.net. The present solution thus utilises the IMS identity to validate or allow the user to make remote access to the local network as well, regardless of which terminal is used. As mentioned above in connection with FIG. 1, a remote device user must use a valid IMS identity for accessing a local network over an IMS core. An authorised user will then basically be able to access the local network remotely from any terminal by means of his/her IMS identity, without requiring any specific authorization of the actual terminal used.

In this step, a useful trust model is established as the local network owner explicitly specify that the user is allowed to remotely access the network, e.g. by adding the IMS identity of the user to an ACL (Access Control List) or the like of the local network. Hence, this trust model is leveraged on the notion that the user has been both authenticated and authorised by existing IMS security mechanisms prior to admitting his/her remote device 300 for access to the local network. These IMS security mechanisms are thus generally considered to be reliable and trustworthy.

The ACL thus contains IMS identities of users allowed for remote access, and may be stored and maintained either in the RA server 304a or at the local gateway 302, e.g. in RA manager console 302c. Step 402 can be considered to basically represent a provisioning operation, i.e. provisioning of remote device users for remote access to the local network.

Two examples of how step 402 can be implemented in practice for a specific user will be described later below with reference to FIGS. 6 and 7, respectively.

In addition, a UPnP based ACL may also be used to control remote access for different UPnP devices, e.g. as a "white list" or "black list", containing a UUID (Universally Unique Identifier) of each device allowed or denied for remote access. UUID is a standardized identifier for UPnP devices containing 128 bits which is thus associated with the device rather than the user. The UPnP based ACL is maintained in the RAS of the local gateway, and can thus be used in addition to the IMS based ACL which will be described in more detail below with reference to some implementation examples shown in FIGS. 8 and 9. If both an IMS based ACL and a UPnP based ACL are used for access control, both the user and the device will be authorised independently which will enhance the access control significantly. In practice, these ACLs will be implemented somewhat differently in UPNP and IMS, respectively. The IMS based ACL is basically a set of data forming filter criteria for the remote access service. The UPnP based ACL is the so-called "RADAConfig filters" which can be either a whitelist or a blacklist.

Returning to FIG. 4, an access request is received at some point from a remote device over the IMS core, in a further step 404. For example, the requesting device user may intend to fetch data from a media server, or send data to a media renderer or storage in the network. In this step, the access request may be received and handled either at the IMS core or at the local gateway, depending on where the IMS based ACL is stored and maintained, which will be described in more detail below.

It is then determined in a following step 406 whether the remote device user has been authorised for remote access or not according to the above step 402. For example, it may be checked if the access request can be accepted or not based on an IMS based ACL established in step 402, i.e. basically if the remote device user's IMS identity is present in the ACL.

The access request can be accepted in a step 408 if it is determined in step 406 that the remote device user is authorised, and a communication session can be executed accordingly, involving the remote device and a local device in the local network. On the other hand, if step 406 reveals that the remote device user is not authorised, it may further be determined whether the access request can be accepted by the local network owner, as illustrated by a step 410. For example, a query may be placed to the local network owner as to whether the device user can be accepted for remote access or not. Alternatively, the access request may simply be rejected, as illustrated by a dashed step 410a.

Steps 404-410/410a can be considered to basically represent a runtime operation, i.e. establishment of remote access to the local network for the remote device. Two examples of how steps 404-410 can be implemented in practice for a specific user will be described later below with reference to FIGS. 8 and 9, respectively.

Figure 5:
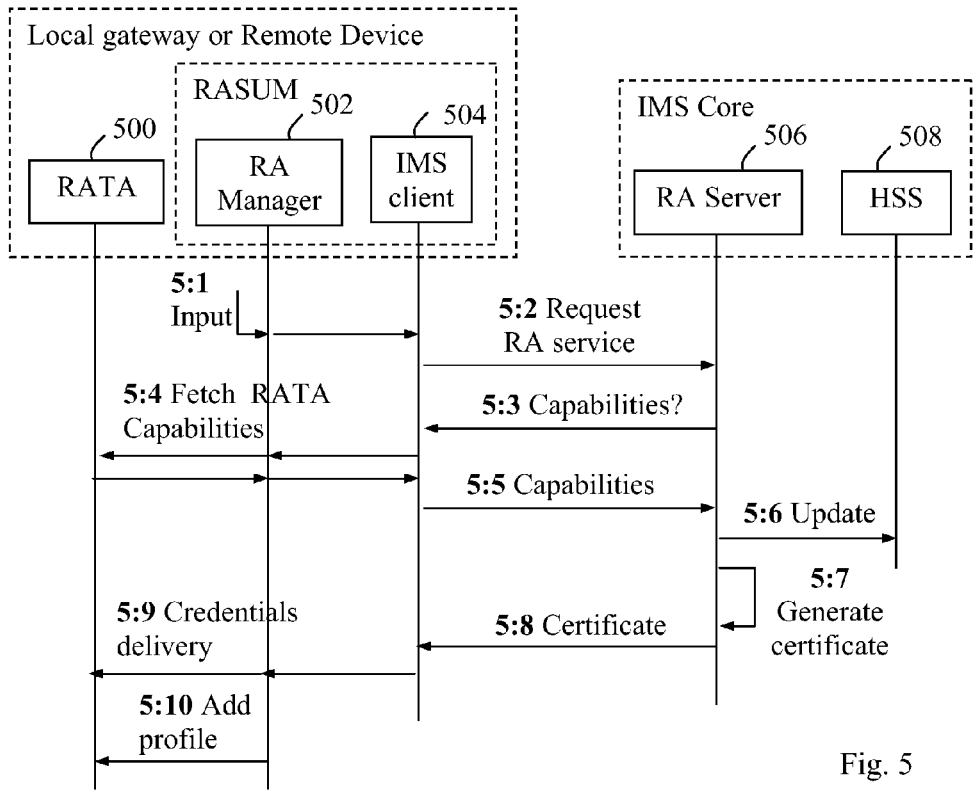
FIG. 5 is a signalling diagram illustrating how capabilities and credentials of a local gateway and a remote device can be configured in an IMS core for a remote access service, in accordance with another embodiment.

FIG. 5 illustrates in more detail an exemplary embodiment for determining capabilities and configuring credentials of a local gateway and a remote device in an IMS core for a remote access service, i.e. basically according to the above step 400. In practice, this process is executed separately for the local gateway and the remote device, although the same process is valid for either party therefore described here only once. Both the local gateway and the remote device comprises a RATA 500 and a RASUM with an RA manager 502 and an IMS client 504, which have all been described above. The local gateway may be a HIGA.

In the remote device, RATA 500 resides in a RAC, and in the local gateway, RATA 500 resides in a RAS. In the local gateway, the RASUM may be a module of a SIP user agent in a HIGA. The IMS core comprises an RA server 506 and an HSS node 508. In this example, IMS client 504 and RA server 506 communicate by means of SIP, although the present invention is not generally limited thereto.

A first step 5:1 illustrates that a local network owner provides some suitable input to initiate the configuration process, resulting in a trigger signal to the IMS client 504 which then sends a request for a remote access service in a suitable SIP message to the IMS core, in a next step 5:2, which is received by the RA manager 502. This is thus a service activation step and, preferably, the user has already made a service agreement with the IMS operator.

In a next step 5:3, the RA server 506 sends a request for capabilities of the RATA 500 to IMS client 504 in another suitable SIP message. The RASUM is then able to extract this capability request from the SIP message. In a further step 5:4, the RATA capabilities are basically fetched from RATA 500. In this step, after parsing the SIP message received in the previous step, the RASUM function effectively creates and issues a request to RA manager 502 which in turn fetches the capabilities from RATA 500 which are the delivered back to the IMS client 504. For example, the RATA capabilities may include "supporting IPsec and IKE (Internet Key Establishment) based on certificates".

In a next step 5:5, IMS client 504 sends the RATA capabilities over to RA server 506 in yet another suitable SIP message, in response to the capability request of step 5:3 above. RA server 506 then stores the RATA capabilities in the HSS node 508 for later use, here illustrated as a step 5:6 of updating remote access service data for each of the local gateway and the remote device.

In a following step 5:7, RA server 506 generates a certificate as remote access credentials for each of the local gateway and the remote device. If certificate based IPSec is supported, an x.509 certificate may be generated in this step. This step could effectively be performed by means of a third party entity, such as a recognized certificate authority.

In a next step 5:8, RA server 506 sends a generated certificate as remote access credentials to IMS client 504 in the local gateway and the remote device, respectively. As indicated above, an x.509 certificate can be generated as credentials by RA server 506 or alternatively by a third party server (not shown). The distribution of the credentials over a transport network to IMS client could be either push-based or pull-based. Push-based distribution of credentials could be implemented by a message HTTP POST from RA server 506, whereas pull-based distribution of credentials could be implemented by a message HTTP GET from the remote device or local gateway as triggered by a suitable SIP message.

Having received the certificate, IMS client 504 delivers it as credentials to RATA 500 over RA manager 502, illustrated as a joint step 5:9. Finally, RA manager 502 is triggered by the RASUM to create a new profile in the RATA 500, indicated as a last step 5:10. This profile may thus indicate that the remote access end point, i.e. RAS or RAC, supports an IPSec based VPN and has the necessary credentials, in the case the certificate, to do this. The RATA 500 at the local gateway and the remote device, respectively, is now technically ready to establish remote access connections. However, a remote device user must first be authorised for remote access as stipulated by step 402 in FIG. 4.

Different alternative procedures are possible for how the local network owner is able to create an IMS based ACL or the like containing IMS identities of users allowed to establish a remote access connection to the local network. FIGS. 6 and 7 illustrate two alternative embodiments which could be referred to as a "server sided" procedure and a "gateway sided" procedure, respectively. The identities of allowed users can generally be specified in different ways. According to current IMS standards, users are uniquely identified based on so-called "P-asserted identities" which may be identifiers such as a SIP URI, and/or a tel URI i.e. a telephone number e.g. 070123456.

Figure 6:
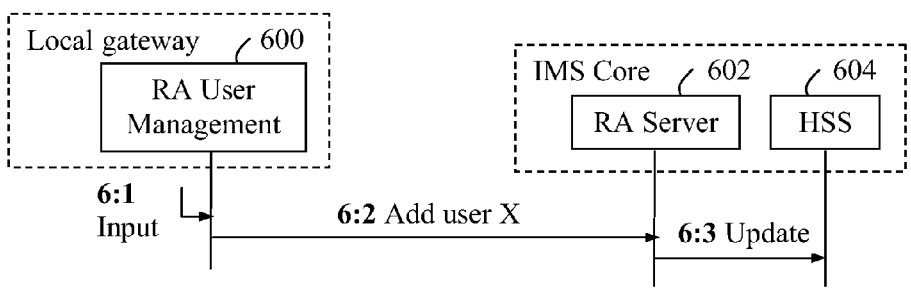
FIG. 6 is a signalling diagram illustrating how a user X can be authorised to access a local gateway from a remote device when an ACL is maintained in an IMS core, in accordance with yet another embodiment.
Figure 7:
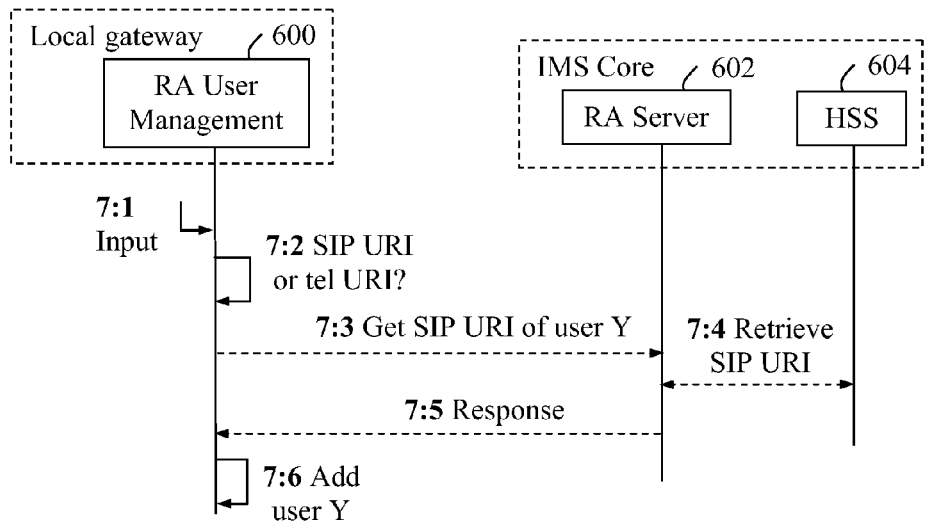
FIG. 7 is a signalling diagram illustrating how a user Y can be authorised to access a local gateway from a remote device when an ACL is maintained in the local gateway, in accordance with yet another embodiment.

FIGS. 6 and 7 illustrate two alternative embodiments for authorising a user to access a local gateway from a remote device located outside the network, i.e. basically according to the above step 402. In FIG. 6, an ACL is maintained for the local network in the IMS core, and in FIG. 7, the ACL is maintained in the local gateway. As mentioned above, a UPnP based ACL may additionally be used to authorise remote UPnP devices for remote access to the local gateway.

In FIG. 6, a local gateway comprises an RA user management module 600 and the IMS based ACL is maintained in an IMS core comprising an RA server 602 and an HSS node 604. The RA user management module 600 may be implemented in a RASUM unit and the ACL may reside in the RA server 602 or in the HSS node 604. Moreover, certain filter criteria of the local network may have previously been stored in the HSS node 604 for the remote access service during the configuring process of FIG. 5, e.g. after step 5:2. "INVITE" is a SIP message that is generally used by end user devices for initiating a session. A session control node in the IMS network called P-CSCF (Proxy Call Session Control Function) may apply a filtering function for any received INVITE messages according to filter criteria stored for the remote access service, if any.

A first step 6:1 illustrates that a local network owner inputs a telephone URI or a SIP URI of a user X in the RA user management module 600 at a suitable GUI (Graphical User Interface), in order to add user X to the IMS based ACL. In this case, the server sided procedure is used, and the local network owner could provide either a SIP URI or a telephone URI or other identity of user X known to the IMS core. In a next step 6:2, a request for authorising user X is submitted to RA server 602, e.g. in an XCAP message. Optionally, the authorising request may be sent from any device having an IMS client implemented. In response thereto, RA server 602 retrieves and adds a SIP URI of user X in the ACL and updates service data for the local gateway in the HSS node 604, e.g. including the above-described filter criteria, in a step 6:3.

In the embodiment illustrated in FIG. 7, the shown RA user management module 600 and RA server 602 are basically the same as in FIG. 6 although the IMS based ACL is maintained at the local gateway, e.g. in the RA user management module 600. As a result, the procedure of authorising remote access for a user Y is somewhat different from that in FIG. 6, using the gateway sided procedure in this case. In this scenario, the local gateway performs the filtering of incoming SIP INVITE messages from callers containing a remote access connection request, by checking the SIP URI (P-asserted identity) of the caller. The local network owner could specify either the SIP URI or a telephone URI of a user when adding that user to the ACL. If a telephone URI is specified, the local network must know the corresponding SIP URI to be able to perform the above-mentioned filtering operation. Therefore, and if a telephone URI is provided, the local network would need to query the IMS core for the corresponding SIP URI of the user.

The first step 7:1 of entering a telephone URI or a SIP URI of user Y as input in RA user management module 600 is basically the same as step 6:1. Module 600 then determines in a next step 7:2 whether a SIP URI or a tel URI was entered in step 7:1. If a telephone URI was entered in step 7:1, the corresponding SIP URI must be retrieved for storage in the ACL, and module 600 therefore sends a request to RA server 602 for a SIP URI corresponding to the telephone URI, in a further step 7:3. RA server 602 then retrieves the corresponding SIP URI from the HSS 604 based on the telephone URI, in a next step 7:4.

In response to the request of step 7:2, RA server 602 then sends the SIP URI of user Y in a following step 7:5, being a P-asserted identity of user Y. In this step, the SIP URI may be sent in a suitable SIP message. Finally, RA user management module 600 adds the SIP URI of user Y to the ACL in a last step 7:6. However, if it was determined in step 7:2 that a SIP URI was entered in step 7:1, it can be stored in the ACL directly, thus omitting steps 7:3-7:5 in that case. In either case, a user-friendly identity is preferably displayed to the local network owner instead of the SIP URI.

Since the local gateway now performs the filtering of any incoming requests for remote access, e.g. as SIP INVITE messages, these remote access requests should preferably contain a P-asserted identity, which puts a requirement on the caller device and the IMS core. For example, the calling device may be obliged to indicate an appropriate security level in the SIP header, and therefore the IMS core should not stripe out the P-asserted identity in the SIP header, but rather pass it to a SIP User Agent in the local gateway. The caller device, being the remote access connection initiator, may therefore set the Privacy header field in the INVITE message to 'none'. Thereby, the P-asserted identity will not be removed by the P-CSCF when forwarding the message to the local gateway.

Figure 8:
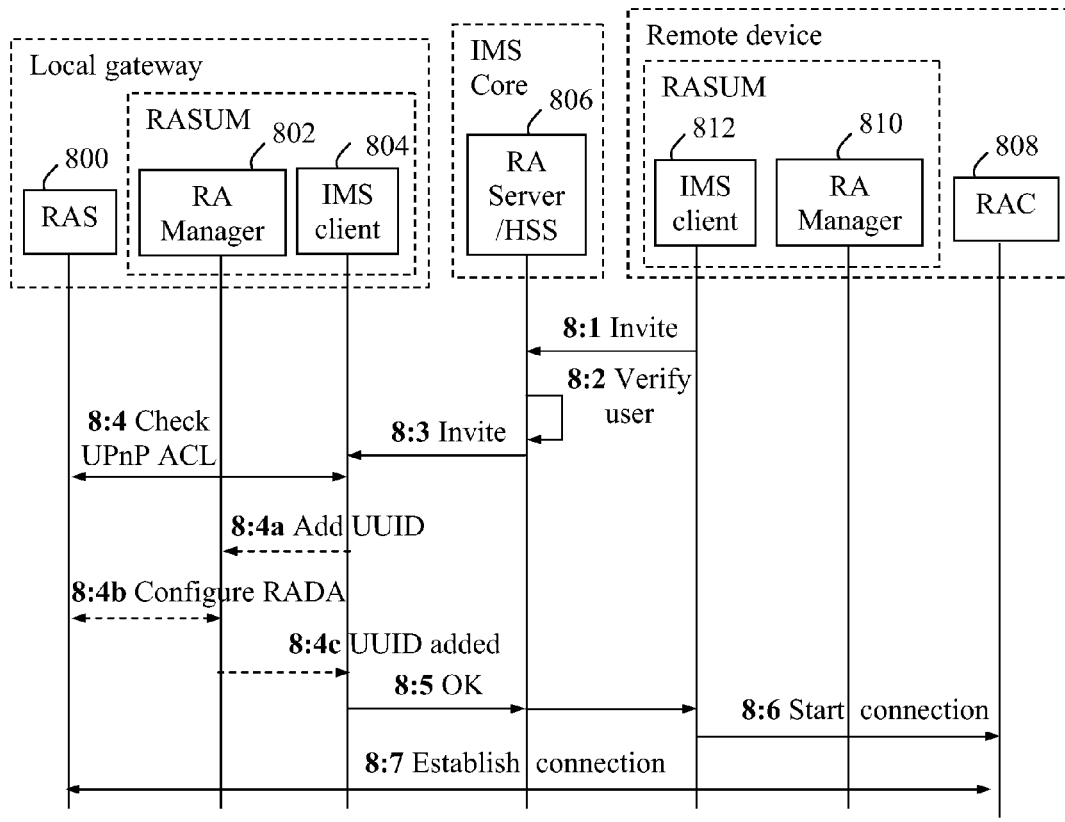
FIG. 8 is a signalling diagram illustrating a procedure for establishing remote access to a local network for a remote device when its user has been authorised previously, in accordance with yet another embodiment.

A procedure for establishing remote access to a local network for a remote device according to an exemplary embodiment, will now be described with reference to FIG. 8. This figure basically illustrates the runtime operation represented by steps 404-410/410a in FIG. 4. It is assumed that capabilities and credentials of the remote device and of a local gateway in the network have previously been configured in an IMS core for remote access, e.g. as described for FIG. 5. In this example, an IMS based ACL containing IMS identities of users allowed for remote access, is maintained in the IMS core for the local gateway, i.e. the server sided procedure has been used for the above authorisation of users. Further, the user of the remote device has been authorised for remote access in this case thus being present in the ACL. Further, a UPnP based ACL containing UUIDs of devices allowed for remote access, is also used in the local gateway in the shown example, for remote access control of devices.

The local gateway comprises a RAS 800 and a RASUM including an RA manager console 802 and an IMS client 804. The UPnP based ACL is maintained in the RAS 800. The IMS core comprises an RA server 806 having access to HSS-stored information, and the IMS based ACL may be maintained as filter criteria in the RA server or in the HSS or other suitable node in the IMS core, depending on the implementation. The remote device comprises a RAC 808 and a RASUM likewise including an RA manager console 810 and an IMS client 812. It is assumed that both the local network owner and the device user are subscribers to an IMS based RA service, thereby having a trusted relationship based on IMS security.

In a first shown step 8:1, the IMS core receives an invite message from IMS client 812 in the remote device, effectively being a session invitation from the user of the device directed the local gateway. The invite message may be a SIP INVITE and includes an IMS identity of the device user, e.g. a SIP URI. Further, a UUID of the remote device is included in the SIP body.

In a next step 8:2, the ACL in the IMS core is checked in order to verify that the device user is authorised to invoke a remote access connection to the local network, and it is also checked that RAC 808 has capabilities matching those of RAS 800. Thus, if the device user is present in the IMS based ACL, e.g. as a result of the procedure shown FIG. 6, and is capable of communicating with RAS 800, a remote access connection between RAC 808 and RAS 800 is possible and can be allowed. Next, the invite message received in step 8:1 is sent from RA server 806 to IMS client 804 in the local gateway, in a following step 8:3.

At the local gateway, it is now checked if the device identity UUID is present in the UPnP based ACL of RAS 800, in a next step 8:4. If the device identity UUID is not present in the UPnP based ACL, it can be added thereto by a trigger message from the RA manager console 802 in a step 8:4a. The RADA of RAS 800 will then be configured accordingly, including adding the UUID to the UPnP based ACL, in a step 8:4b, using a conventional setup procedure for UPnP remote access. The RA manager console 802 also confirms to IMS client 804 that the remote device has been successfully added to the UPnP based ACL, in a step 8:4c. On the other hand, if it is found in step 8:4 that the remote device is already present in the UPnP based ACL, steps 8:4a-8:4c can be omitted.

In either case, inbound connection configuration can be done at the local gateway by opening a "pin hole" in a NAT/firewall of the local gateway, in preparation for a remote access session. The calling device user is then notified in a step 8:5 that the local gateway has accepted remote access from the remote device, by means of a suitable OK message from IMS client 804 to IMS client 812, e.g. SIP 200 OK, which is conveyed over the IMS core.

After a suitable trigger message in a step 8:6 from IMS client 812 to RAC 808 for initiating a remote access connection, the connection is finally established between RAC 808 and RAS 800 in a step 8:7. Establishing the connection may include setting up a VPN tunnel between RAC 808 and RAS 800 based on credentials for the remote device stored in RAS 800, e.g. delivered according to steps 5:7-5:9 of FIG. 5. The VPN tunnel may be initiated by RAC 808 according to the UPnP specification for remote access.

Figure 9:
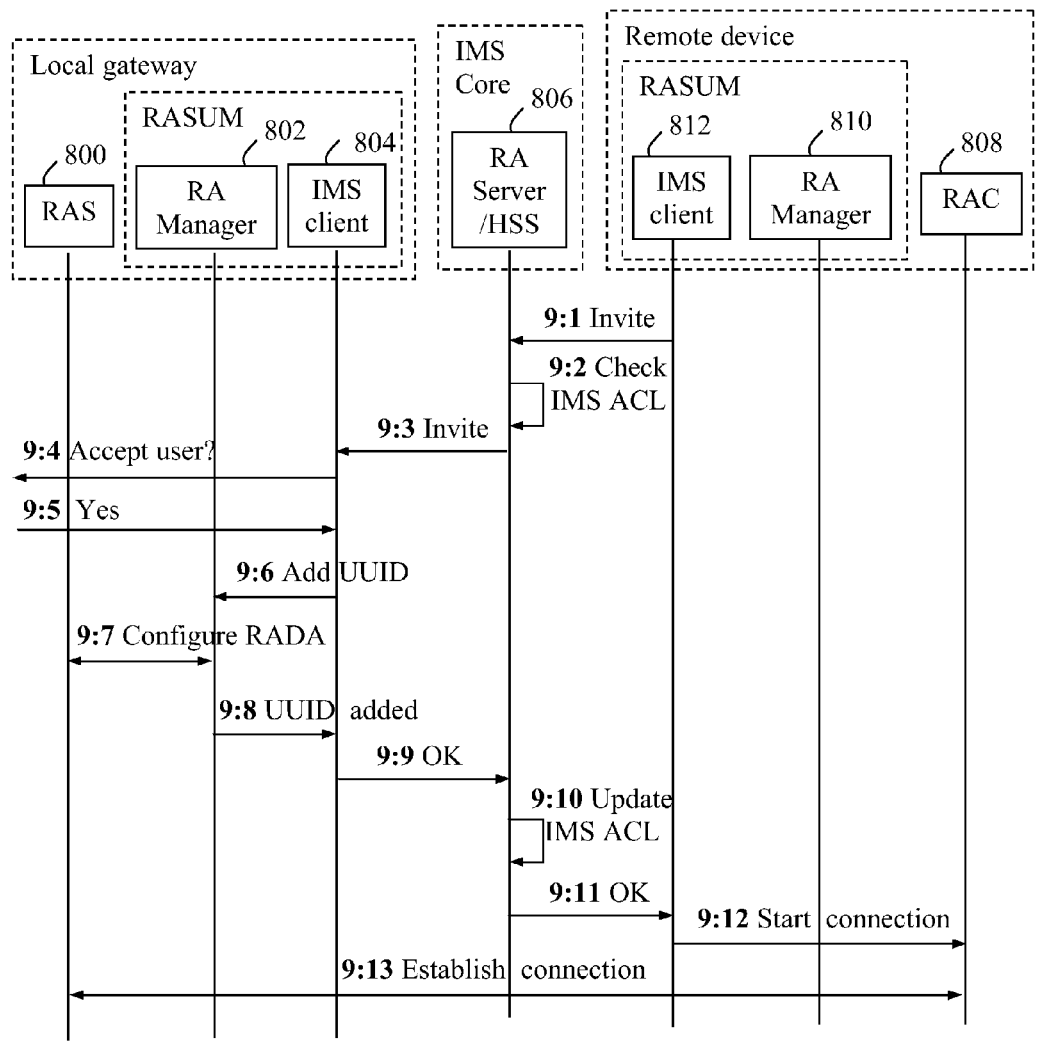
FIG. 9 is a signalling diagram illustrating a procedure for establishing remote access to a local network for a remote device when its user has not been authorised previously, in accordance with yet another embodiment.

Another exemplary procedure for establishing remote access to a local network for a remote device will now be described with reference to FIG. 9. The remote device, IMS core and local gateway involved are basically the same as in FIG. 8, and the functional units 800-812 are therefore reused in FIG. 9. Again, it is assumed that capabilities and credentials of the remote device and of the local gateway have been configured in the IMS core for remote access. In this example, the IMS based ACL of the local gateway is likewise maintained in the IMS core, but the user of the remote device has not been authorised for remote access previously and his/her IMS identity is therefore not present in the ACL. Further, a UPnP based ACL is also maintained in RAS 800 in this case, and the UUID of the remote device is not in the UPnP based ACL.

First, the IMS core receives an invite message from the remote device including an IMS identity of the user and a UUID of the device, in a first step 9:1, as a session invitation directed the local gateway, i.e. the equivalent of step 8:1 above. In a next step 9:2, the IMS based ACL of the local gateway is checked at the IMS core to see if the device user can be verified/allowed for remote access. It may also be also checked if the remote device and the local gateway have matching capabilities for remote access, that is, if RATA capabilities and credentials have been configured for the remote device and gateway according to the procedure of FIG. 5.

However, the IMS identity of the user is not found in the ACL in this case, and the invite message is sent from RA server 806 to IMS client 804 in the local gateway with an indication that the device user has not been verified according to the IMS based ACL, in a following step 9:3. This may be indicated by adding a corresponding key word or the like to the invite message, e.g. in the SIP body or the SDP (Session Description Protocol) body. Nevertheless, the remote device may be technically capable of establishing a connection with the local gateway by having matching capabilities.

In a further step 9:4, since the device user could not be verified, the local network owner is notified that an unverified user has made an invitation for a remote access session, and a query is placed to the owner as to whether the device user can be accepted for remote access or not, by means of a suitable GUI. In this case, the network owner accepts the user for remote access, as shown by a next step 9:5. In a following step 9:6, the IMS client 804 triggers RA manager console 802 to add the UUID of the remote device to the UPnP based ACL in RAS 800, and the RADA of RAS 800 is configured accordingly in a step 9:7, using the normal UPnP remote access setup procedure. The RA manager console 802 also confirms to IMS client 804 that the remote device has been successfully added to the UPnP based ACL, in a step 9:8. The inbound connection configuration can now be done by opening a NAT/firewall pin hole in the local gateway, in preparation for a remote access session.

A notification is then sent from IMS client 804 towards IMS client 812 in a step 9:9, indicating that the local gateway accepts remote access from the remote device, by means of a suitable OK message, e.g. SIP 200 OK, which is first received by RA server 806. Having received the notification, RA server 806 then updates the IMS based ACL by adding the user's IMS identity thereto, in a further step 9:10. RA server 806 also sends the OK message to IMS client 812 in a step 9:11. IMS client 812 also sends a connection trigger message to RAC 808 in a step 9:12, to initiate the remote access connection. Finally, the connection is established in a step 9:13, e.g. by setting up a VPN tunnel between RAC 808 and RAS 800 based on credentials for the remote device stored in RAS 800, as described for the previous example of FIG. 8.

Using the present invention, the above-described problem of the trust model can be solved in a way that will enable secure remote access connections for a user authorised by means of his/her IMS identity in the IMS based ACL, regardless of which device is used. As shown by the examples above, the device currently used for the remote access can also be authorised in the UPnP based ACL. The problem of delivering credentials while ensuring compliance with UPnP RADA can also be solved. Compliance can also be achieved by mimicking all interactions between the UPnP RADA and UPnP RATA and the management console in the RAC and RAS, respectively.

By re-using IMS authentication/authorization for trust establishment, the above-described solution further enables the IMS system to be used for delivery of credentials, e.g. certificates. The above-described solution can further be used to avoid the requirement that the RAC and RAS must be located in the same physical local network for the discovery or pairing process as defined for UPnP RA, thereby making the UPnP remote access architecture more attractive and useful.

While the invention has been described with reference to specific exemplary embodiments, the description should not be taken as limiting the scope of the invention. The present invention is generally defined by the following independent claims.

The invention claimed is:

1. A method of enabling remote access to a local gateway of a local network from a remote device located outside the local network, comprising:
configuring capabilities and credentials of the remote device and of the local gateway in an IP Multimedia Subsystem (IMS) core for the remote access, wherein said capabilities and credentials are configured when the remote device is located outside the local network,
authorizing one or more users for remote access to the local network by adding an IMS identity of each authorized user to an IMS based Access Control List (ACL),
receiving an access request to the local gateway from the remote device over the IMS core,
accepting said access request when a user of the remote device has been authorized for remote access responsive to the user's IMS identity in said IMS based ACL,
establishing a remote access connection, when accepted, using the configured capabilities and credentials of the remote device located outside the local network and the local gateway, and
controlling access for the one or more users in response to the IMS based ACL and authorizing the remote device in response to an UPnP based ACL.

2. A method according to claim 1, wherein said capabilities and credentials of the remote device are configured by IMS messaging between an IMS client in the remote device and a remote access server in the IMS core, and said capabilities and credentials of the local gateway are configured by IMS messaging between an IMS client in the local gateway and the remote access server.

3. A method according to claim 1, wherein said credentials include a certificate for Virtual Private Network (VPN) tunnel establishment.

4. A method according to claim 1, wherein said capabilities include RATA capabilities of a Remote Access Server (RAS) in the local gateway and RATA capabilities of a Remote Access Client (RAC) in the remote device.

5. A method according to claim 1, wherein an authorized user is allowed to access the local network remotely from any terminal responsive to the user's IMS identity.

6. A method according to claim 1, wherein the IMS based ACL is maintained in a remote access server at the IMS core.

7. A method according to claim 1, wherein the IMS based ACL is maintained at the local gateway.

8. A method according to claim 1, wherein when the remote device user has not been authorized for remote access responsive to the user's IMS identity, it is determined whether said access request is acceptable to a local network owner controlling the local network.

9. A method according to claim 8, wherein a query is placed to the local network owner as to whether the access request can be accepted or not.

10. A method of enabling remote access to a local gateway of a local network from a remote device located outside the local network, comprising:
configuring capabilities and credentials of the remote device and of the local gateway in an IP Multimedia Subsystem (IMS) core for the remote access, wherein said capabilities and credentials are configured when the remote device is located outside the local network, authorizing one or more users for remote access to the local network by adding an IMS identity of each authorized user to an IMS based Access Control List (ACL), receiving an access request to the local gateway from the remote device over the IMS core, accepting said access request when a user of the remote device has been authorized for remote access responsive to the user's IMS identity in said IMS based ACL, and establishing a remote access connection, when accepted, using the configured capabilities and credentials of the remote device located outside the local network and the local gateway, wherein a UPnP based ACL containing UUIDs of devices allowed for remote access, is maintained in the local gateway, wherein the devices allowed for remote access are located outside the local network.

wherein the UUID of said remote device is added to the UPnP based ACL when said access request is accepted.

11. A remote access server in an IP Multimedia Subsystem (IMS) core for enabling remote access to a local gateway of a local network from a remote device located outside the local network, the remote access server comprising:

circuitry that configures capabilities and credentials of the remote device and the local gateway in the IMS core for the remote access, wherein the remote access server is adapted to configure said capabilities and credentials when the remote device is located outside the local network.

circuitry that authorizes one or more users for remote access to the local network by adding an IMS identity of each authorized user to an IMS based Access Control List(ACL), circuitry that receives an access request to the local gateway from the remote device over the IMS core, circuitry that accepts said access request when a user of the remote device has been authorized for remote access responsive to the user's IMS identity in said IMS based ACL, circuitry that establishes remote access connection, when accepted, using the configured capabilities and credentials of the remote device located outside the local network and the local gateway, and circuitry that controls access for the one or more users in response to the IMS based ACL and authorizing the remote device in response to an UPnP based ACL.

12. A remote access server according to claim 11, wherein the circuitry that configures said capabilities and credentials is further adapted to configure said capabilities and credentials of the remote device by IMS messaging between an IMS client in the remote device and a remote access server in the IMS core, and to configure said capabilities and credentials of the local gateway by IMS messaging between an IMS client in the local gateway and the remote access server.

13. A remote access server according to claim 11, wherein said credentials include a certificate for VPN tunnel establishment.

14. A remote access server according to claim 11, wherein said capabilities include RATA capabilities of a Remote Access Server (RAS) in the local gateway and RATA capabilities of a Remote Access Client (RAC) in the remote device.

15. A remote access server according to claim 11, wherein an authorized user is allowed to access the local network remotely from any terminal by means of his/her IMS identity.

16. A remote access server according to claim 11, wherein the IMS based ACL is maintained in a remote access server at the IMS core.

17. A remote access server according to claim 11, wherein the IMS based ACL is maintained at the local gateway.

18. An arrangement in a local gateway of a local network for enabling remote access to the local gateway from a remote device located outside the local network, comprising:

circuitry that configures capabilities and credentials of the local gateway in an IMS core for the remote access, wherein the remote device allowed for remote access is located outside the local network, circuitry that receives an access request from the remote device over the IMS core, circuitry that accepts said access request when a user of the remote device has been authorized for remote access responsive to the user's IMS identity, circuitry that establishes a remote access connection when accepted, by means of capabilities and credentials configured for the remote device located outside the local network and the local gateway, circuitry that maintains a UPnP based ACL containing UUIDs of devices located outside the local network allowed for remote access, and circuitry that adds the UUID of said remote device to the UPnP based ACL when said access request is accepted.

19. An arrangement according to claim 18, adapted to determine whether said access request is acceptable to a local network owner controlling the local network, when the remote device user has not been authorized for remote access by-responsive to the user's IMS identity.

20. An arrangement according to claim 19, adapted to place a query to the local network owner as to whether the access request can be accepted or not.

* * * * *

UNITED STATES PATENT AND TRADEMARK OFFICE
CERTIFICATE OF CORRECTION

PATENT NO.      : 8,503,462 B2
APPLICATION NO. : 12/867993
DATED           : August 6, 2013
INVENTOR(S)     : Damola et al.

It is certified that error appears in the above-identified patent and that said Letters Patent is hereby corrected as shown below:

On Title Page 2, in item (56), under "OTHER PUBLICATIONS", in Column 2, Lines 1-2, delete "Paten tApplication" and insert -- Patent Application --, therefor.

In the Claims

In Column 15, Line 16, in Claim 10, delete "network." and insert -- network, --, therefor.

In Column 15, Lines 27-28, in Claim 11, delete "network." and insert -- network, --, therefor.

Signed and Sealed this
Thirty-first Day of December, 2013

Margaret A. Focarino
*Commissioner for Patents of the United States Patent and Trademark Office*